US006487869B1

(12) United States Patent
Sulc et al.

(10) Patent No.: US 6,487,869 B1
(45) Date of Patent: Dec. 3, 2002

(54) COMPRESSOR CAPACITY CONTROL SYSTEM

(75) Inventors: Vladimir Sulc, St. Paul, MN (US); David Jon Renken, Prior Lake, MN (US)

(73) Assignee: Themo King Corporation, Minneapolis, MN (US)

(*) Notice: Subject to any disclaimer, the term of this patent is extended or adjusted under 35 U.S.C. 154(b) by 0 days.

(21) Appl. No.: 09/993,997

(22) Filed: Nov. 6, 2001

(51) Int. Cl.[7] .............................. F25B 1/00; F25B 49/00
(52) U.S. Cl. ........................................ 62/230; 62/228.4
(58) Field of Search ................................ 62/230, 228.1, 62/228.3, 228.4, 217

(56) References Cited

U.S. PATENT DOCUMENTS

| | | |
|---|---|---|
| 4,184,341 A | 1/1980 | Friedman |
| 4,485,635 A | 12/1984 | Sakano |
| 4,487,031 A | 12/1984 | Rogers et al. |
| 4,538,422 A | 9/1985 | Mount et al. |
| 4,546,618 A | 10/1985 | Kountz et al. |
| 4,633,675 A | 1/1987 | Sato |
| 4,722,196 A | 2/1988 | Ishikawa |
| 4,723,416 A | 2/1988 | Suzuki |
| 4,753,083 A | 6/1988 | Sato |
| 4,794,762 A | 1/1989 | Orth et al. |
| 4,800,730 A | 1/1989 | Hipfl et al. |
| 4,843,834 A | 7/1989 | Inoue et al. |
| 5,203,179 A | 4/1993 | Powell |
| 5,295,364 A | 3/1994 | Truckenbrod et al. |
| 5,355,691 A | 10/1994 | Sullivan et al. |
| 5,537,830 A | 7/1996 | Goshaw et al. |
| 5,548,969 A | 8/1996 | Lee |
| 5,553,997 A | 9/1996 | Goshaw et al. |
| 5,557,941 A * | 9/1996 | Hanson et al. ................ 62/160 |
| 5,572,879 A * | 11/1996 | Harrington et al. ........... 62/217 |
| 5,586,444 A | 12/1996 | Fung |
| 5,669,225 A | 9/1997 | Beaverson et al. |
| 5,689,963 A | 11/1997 | Bahel et al. |
| 5,937,660 A * | 8/1999 | Lau et al. ..................... 62/174 |
| 6,196,012 B1 * | 3/2001 | Reason et al. ............... 62/225 |
| 6,226,998 B1 * | 5/2001 | Reason et al. ............... 62/230 |
| 6,301,911 B1 * | 10/2001 | Reason et al. ............. 62/196.2 |
| 6,318,100 B1 * | 11/2001 | Brendel et al. .............. 62/217 |

* cited by examiner

Primary Examiner—Denise L. Esquivel
Assistant Examiner—Marc Norman
(74) Attorney, Agent, or Firm—Michael Best & Friedrich LLP

(57) ABSTRACT

A method of controlling a compressor in a transport temperature control unit having a prime mover providing power to the compressor. The compressor has a power requirement that varies depending on loading conditions. The method includes determining the maximum power available from the prime mover, determining the power requirement of the compressor, and adjusting the loading conditions of the compressor so that the power requirement of the compressor substantially equals the maximum power available from the prime mover. Preferably, the method includes starting the compressor at a low speed, varying the suction pressure as permitted by the maximum amount of power available until the suction pressure reaches a maximum suction pressure setting, and after the suction pressure reaches a maximum suction pressure setting, increasing the speed of the compressor as permitted by the maximum-amount of power available.

24 Claims, 4 Drawing Sheets

COMPRESSOR CAPACITY CONTROL SYSTEM

FIELD OF THE INVENTION

The invention relates to transport temperature control units, and more particularly to a method of controlling the compressor of a transport temperature control unit.

BACKGROUND OF THE INVENTION

Straight trucks and tractor-trailers (hereinafter referred to as "vehicles") frequently transport cargo that must be maintained within a predetermined temperature range during transportation in order to preserve the quality of the cargo. Vehicles that transport such temperature-sensitive cargo have a conditioned space that is maintained within the predetermined temperature range by a temperature control unit. The operation of the temperature control unit is monitored and controlled by an electronic controller.

One component of the temperature control unit is a compressor that raises the pressure of the refrigerant circulating through the temperature control unit. Typically, the compressor is driven by a prime mover such as a diesel engine or an electric motor. The prime mover provides power to drive the compressor when the temperature control unit is operating. Most existing temperature control units are designed so that when maximum cooling capacity or "pull-down" is required to cool the conditioned space of the container, the compressor runs at a high speed. When the desired temperature or "set-point" is achieved, the compressor speed is reduced. When pull-down is again required due to increased temperatures in the conditioned space, the compressor is again run at high speeds until the set-point is reached.

SUMMARY OF THE INVENTION

Running the compressor at high speeds during pull-downs creates various problems. First, the amount of power required to run the compressor at high speeds can be relatively high, thereby increasing the horsepower requirement of the compressor. With many of today's compact temperature control units, the prime movers are simply too small to provide the power necessary to maximize the compressor's capacity and pull-down potential at high operating speeds.

Second, running the compressor at high speeds increases the noise output of the temperature control unit. Noise levels would be greatly diminished if the amount of high-speed compressor run time could be reduced.

Therefore, it is desirable to utilize a compressor control system that automatically increases the compressor's capacity while reducing the amount of high-speed compressor run time, and therefore the peak power requirements and the noise generated by the compressor. The method of compressor control embodying the invention increases the compressor's capacity and pull-down potential by monitoring and altering the loading characteristics of the compressor in relationship to the power available from the prime mover.

More specifically, the present method controls the operating conditions of the compressor based on a comparison of power requirements for the compressor operating under different loading conditions. The system continually monitors the power requirements of the compressor at the actual operating mode and compares that actual power requirement to the maximum power available from the prime mover. Based on this comparison, the system determines whether the compressor is operating in the proper mode with the appropriate loading conditions, or whether the operating mode of the compressor should be switched to maximize capacity.

By constantly monitoring the various operating modes of the compressor to achieve maximum capacity based on the available power, the compressor can achieve faster temperature pull-downs, even when the conditioned space experiences regular door openings. Additionally, the amount of high-speed run time of the compressor is reduced, thereby reducing the noise level of the compressor and the temperature control unit as a whole.

More specifically, the invention provides a method of controlling a compressor in a transport temperature control unit. The temperature control unit includes a prime mover providing power to the compressor. The compressor has a power requirement that varies depending on loading conditions of the compressor. The method includes determining the maximum power available from the prime mover, determining the power requirement of the compressor, and adjusting the loading conditions of the compressor so that the power requirement of the compressor substantially equals the maximum power available from the prime mover.

In one aspect of the invention, the maximum power available is determined via unit testing. The power requirement of the compressor can be determined using the equation:

$$P = p_s \cdot V_d \left(\frac{RPM}{60}\right) \cdot \left((PR)^{\left(\frac{n-1}{n}\right)} - 1\right) \cdot \left(\frac{VE}{AE}\right),$$

or can be determined using look-up tables. In another aspect of the invention, adjusting the loading conditions of the compressor includes changing at least one of the speed of the compressor and the suction pressure of the compressor.

The invention also includes a method of compressor control to maximize the pull-down capacity of a temperature control unit with respect to a predetermined maximum power available to run the compressor. The method includes starting the compressor at a low speed, and at suction pressure setting that is equal to or lower than a predetermined maximum value, varying the suction pressure as permitted by the maximum amount of power available to run the compressor until the suction pressure reaches a maximum suction pressure setting, and after the suction pressure reaches a maximum suction pressure setting, increasing the speed of the compressor as permitted by the maximum amount of power available to run the compressor. Once the predetermined maximum power available to run the compressor is surpassed, the method further includes reducing the compressor speed to a minimum speed setting before reducing the suction pressure.

Other features and advantages of the invention will become apparent to those skilled in the art upon review of the following detailed description, claims, and drawings.

Figure 1:
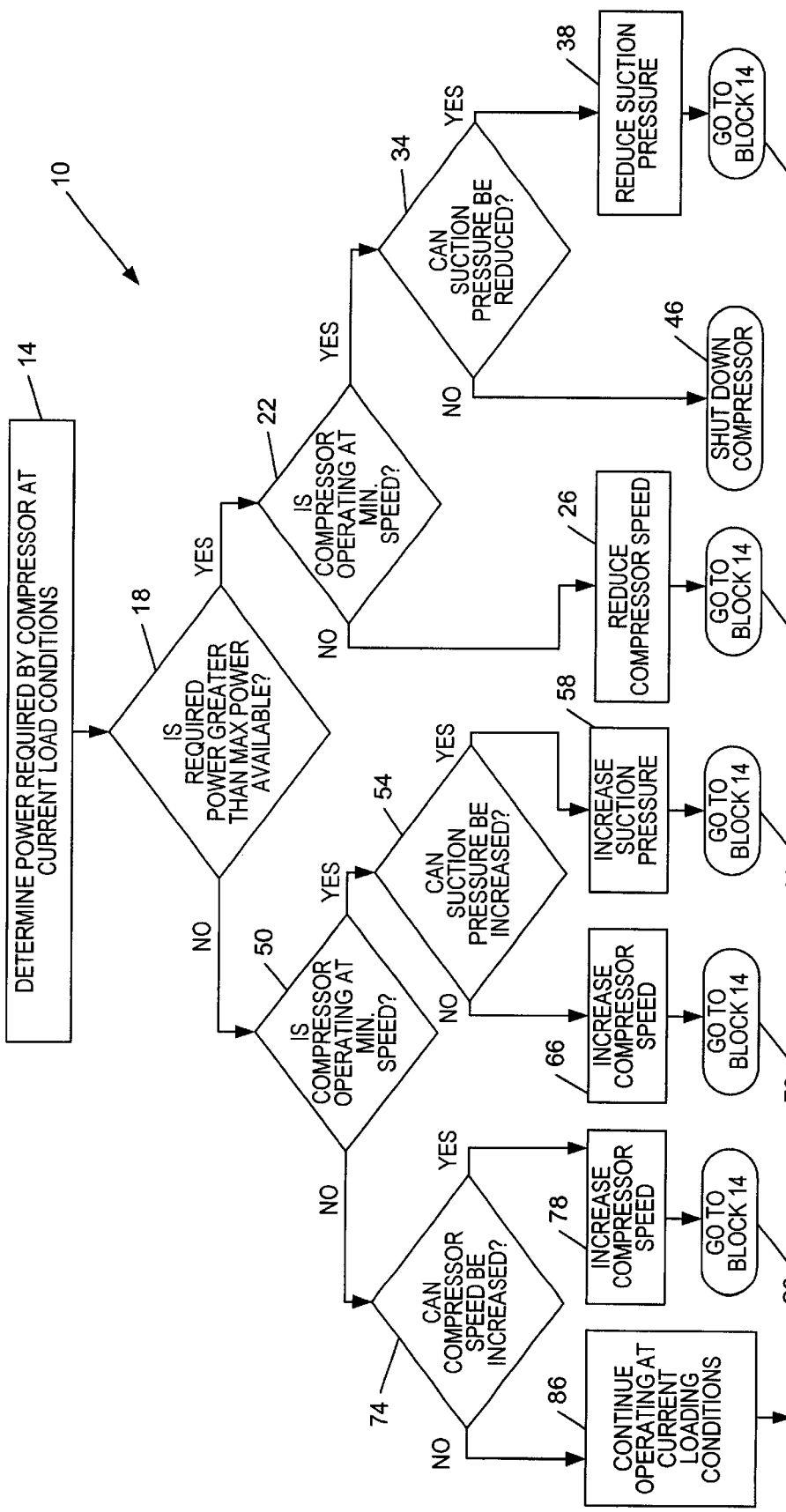
FIG. 1 is a flow chart showing a method of controlling compressor capacity according to the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

The method of the present invention is used to monitor and control the operating mode of a compressor used in a micro-processor controlled temperature control unit. In such a system, the suction pressure of refrigerant entering the compressor, the discharge pressure of refrigerant exiting the compressor, and the compressor RPM is continually monitored. A suction transducer measures refrigerant pressure at the suction end of the compressor and a discharge transducer measures refrigerant pressure at the discharge end of the compressor.

The compressor RPM can be indirectly monitored using the preset or preprogrammed compressor drive RPM values. Alternatively, the compressor RPM can be indirectly determined via the supply frequency provided to an electric motor. An example of a temperature control unit embodying the present invention is described below with respect to FIGS. 3 and 4. However, it is to be understood that the system of the invention can be incorporated in a wide variety of temperature control units.

The flow charts represented in the figures outline an algorithm in the form of a computer program that can be used to practice the method of the present invention. The method can be practiced using any device capable of storing and processing the data in the manner described below, and is preferably undertaken by the microprocessor of the temperature control unit.

FIG. 1 illustrates a compressor control system 10 embodying the invention. The compressor control system 10 begins operating when the compressor is started, and continues operating as the compressor runs. For the purposes of illustration, the compressor control system 10 will be described in operation sometime after initial startup of the compressor, however, the system 10 operates in substantially the same manner described at any time during the startup or continued operation of the compressor.

Before the compressor control system 10 is activated, the compressor is started and operates in a first operating mode under a first set of loading conditions. As used herein and in the appended claims, the term "loading conditions" refers to various operating characteristics of the compressor that impact the load on the compressor, and therefore, the power needed to drive the compressor. Some of these operating characteristics are constants based on the specific compressor used. Other operating characteristics, however, are variable. For example, compressor shaft speed and compressor suction pressure are input variables that directly impact the amount of power required to drive the compressor.

In the illustrated embodiment, the compressor preferably starts in a low-speed operating mode with a suction pressure setting that is equal a predetermined maximum startup suction pressure. The predetermined maximum startup suction pressure is preferably the highest suction pressure setting that will not overload the prime mover at startup. Starting the compressor at a low or minimum speed setting is contrary to most prior art systems that start the compressor in a high-speed mode. By starting the compressor in a low-speed mode and then making the first adjustments to the suction pressure, it has been found that the power requirements for the compressor controlled by the invention can be maximized with increased compressor capacity and pull-down potential.

In addition, unit noise is greatly reduced by operating the compressor at lower speeds. Furthermore, because the suction pressure is kept as high as possible after startup, the pressure differential between the suction end of the compressor and the discharge end of the compressor remains relatively low. Lower pressure differentials in the compressor result in lower refrigerant discharge temperatures, which increases the reliability and the life expectancy of the compressor.

The speed setting of the compressor depends on the specific compressor and the specific prime mover used with the temperature control unit. For example, when the prime mover is a diesel engine, there are typically two or three discrete, predetermined speed settings for the compressor. If the prime mover is a variable frequency electric motor, however, it is possible to infinitely adjust the speed of the compressor by adjusting the supply frequency to the motor.

The suction pressure of the compressor can be controlled using any number of suitable techniques and devices known to those skilled in the art. For example, mechanical or electronic throttling valves, crankcase regulators, or other variable throttling devices can be used to vary the suction pressure at the compressor. As with speed, the maximum suction pressure for a compressor depends on the specific compressor used and the specific prime mover used in the temperature control unit.

Once the compressor is running, the compressor control system 10 begins. At block 14, the system 10 determines the actual power required to operate the compressor under the loading conditions of the first or current operating mode. There are many ways in which the power required to operate the compressor under given loading conditions can be determined, as will be understood by those skilled in the art.

One possibility is to calculate the power requirement for the compressor using the following equation:

$$P = p_s \cdot V_d \left(\frac{RPM}{60}\right) \cdot \left((PR)^{\left(\frac{n-1}{n}\right)} - 1\right) \cdot \left(\frac{VE}{AE}\right) \text{ where:}$$

P=required power $p_s$=suction pressure measured by the suction transducer $V_d$=compressor displacement RPM=compressor shaft revolutions per minute PR=$p_d/p_s$=ratio of compressor discharge pressure ($p_d$) to suction pressure n=polytropic exponent based on compressor tests VE=volumetric efficiency based on compressor tests AE=adiabatic efficiency based on compressor tests Each of these parameters is preferably monitored once the compressor has started, or has been previously determined via compressor testing, in manners known to those skilled in the art. For example, the suction pressure $p_s$ and the discharge pressure $p_d$ are measured by pressure transducers, as described above. The compressor speed RPM is known from predetermined settings or can be determined by the microprocessor. The compressor displacement $V_d$ is a function of the compressor's geometry and is determined by the manufacturer of the compressor. The polytropic exponent n, the volumetric efficiency VE, and the adiabatic efficiency AE are all determined during compressor testing and are functions of the pressure ratio PR and the compressor speed RPM.

Another possible method of determining the actual power required to operate the compressor under the current loading conditions is to use a look-up table stored in the microprocessor. The data in the look-up table can be collected during compressor testing, and can be used by the system 10 to determine the power required by the compressor. For example, compressor tests can be used to generate a look-up table that will provide a compressor torque or power value for given suction pressure $p_s$ and discharge pressure $p_d$ values. Since the suction pressure $p_s$ and discharge pressure $p_d$ values are continuously monitored as the compressor operates, the processor can determine the torque or power value for the current loading conditions from the look-up table. If torque values are used, the actual compressor power can then be derived from the torque values. Of course, other suitable data capable of being correlated to the compressor power can be substituted for the torque value. Additionally, other measurable characteristics can be substituted for suction pressure $p_s$ and discharge pressure $p_d$.

At block 18, the system 10 compares the required power value for the first operating mode (determined at block 14) to the maximum available power generated by the prime mover. The maximum available power value for the prime mover is determined via testing of the temperature control unit as a whole, as is understood by those skilled in the art.

If the required power value is greater than the maximum power available to the compressor (a YES answer at block 18), the compressor is requiring more power than the prime mover can provide and the compressor loading must be reduced to reduce the compressor's power requirement. The system 10 first determines if the compressor is operating at the minimum speed RPM setting at block 22. If the compressor is not operating at the minimum speed RPM setting (a NO answer at block 22), the system 10 reduces the compressor speed RPM at block 26, thereby changing the first operating mode to a second operating mode. As described above, the ability to increase or decrease the compressor speed depends on the specific compressor and prime mover being used. At block 30, the system 10 returns to block 14 and the new power requirement is determined for the second operating mode having the lowered compressor speed RPM value.

If, at block 22, it is determined that the compressor is operating at the minimum speed RPM setting (a YES answer at block 22), the system 10 determines whether the suction pressure $p_s$ can be decreased at block 34. As mentioned above, the suction pressure $p_s$ can be controlled using mechanical or electronic throttling valves, crankcase regulators, or other variable throttling devices. The degree of suction pressure $p_s$ control available depends on the specific throttling or regulating devices and systems used. For example, with an electronic throttling valve, it is possible to infinitely adjust the throttling between fully open (max suction pressure $p_s$) and fully closed (zero suction pressure $p_s$). Other throttling or pressure regulating devices may only have a limited number of discrete settings available to vary the suction pressure $p_s$.

If the suction pressure $p_s$ can be reduced (for example by closing a throttling valve), the power required to run the compressor will also be reduced. Therefore, a YES answer at block 34 will result in the system 10 operating to reduce the suction pressures $p_s$ at block 38, thereby changing the first operating mode to a second operating mode. At block 42, the system returns to block 14 and the power requirement is determined for the second operating mode having the lowered suction pressure $p_s$ value.

If the suction pressure $p_s$ cannot be reduced any further (a NO answer at block 34), the compressor is operating at the minimum speed setting and the minimum suction pressure setting. If the power required by the compressor under these minimum loading conditions is greater than the power available from the prime mover, the system 10 proceeds to block 46 and the compressor is shut down to avoid overloading and damaging the prime mover.

As described thus far, when the system 10 determines that the power required by the compressor is greater than the power available from the prime mover, the system 10 first operates to reduce the compressor speed RPM to the minimum speed setting available. Only after the compressor speed RPM is reduced to the lowest available speed setting will the system 10 attempt to reduce the suction pressure $p_s$. This order of operation minimizes the amount of high-speed compressor run time, thereby minimizing noise output from and wear on the compressor.

Returning to block 18, if the power required to run the compressor is less than the maximum power available from the prime mover (a NO answer at block 18), the system 10 first determines if the compressor is operating at the minimum speed RPM setting at block 50. If the compressor is operating at the minimum speed setting (a YES answer at block 50), the system 10 determines whether the suction pressure $p_s$ can be increased at block 54. Increasing the suction pressure $p_s$ at the inlet of the compressor will increase the load on the compressor, and therefore the amount of power required to run the compressor. Because increasing the suction pressure $p_s$ will increase the cooling capacity of the temperature control unit, and because additional power is available to the compressor, it is desirable to utilize as much power as is available to maximize the unit's capacity and pull-down potential.

If the suction pressure $p_s$ can be increased (a YES answer at block 54), the system 10 increases the suction pressure $p_s$ at block 58 to increase the temperature control unit's capacity, thereby changing the first operating mode to a second operating mode. Just how much the suction pressure $p_s$ is increased again depends on the type of suction pressure control device and system being used. At block 62, the system 10 returns to block 14 and the new power requirement is determined for the second operating mode having the increased suction pressure $p_s$ value.

If the suction pressure $p_s$ cannot be increased any further (a NO answer at block 54), the compressor speed RPM is increased at block 66, thereby changing the first operating mode to a second operating mode. As described above, the ability to increase or decrease the compressor speed depends on the specific compressor and prime mover being used. At block 70, the system returns to block 14 and the new power requirement is determined for the second operating mode having the increased compressor speed RPM value.

Returning to block 50, if the compressor is not operating at the minimum speed RPM setting (a NO answer at block 50), it is understood that the suction pressure $p_s$ is already at its maximum value. This is because the sequence of steps from block 54 is designed to maximize the suction pressure $p_s$ before the compressor speed RPM is increased from the minimum speed setting. Therefore, at block 74, the system 10 determines whether the compressor speed RPM can be increased. If the compressor speed RPM can be increased (a YES answer at block 74), the compressor speed RPM is increased at block 78, thereby changing the first operating mode to a second operating mode. At block 82, the system 10 returns to block 14 and the new power requirement is determined for the second operating mode having the increased compressor speed RPM value.

If the compressor speed RPM cannot be increased further (a NO answer at block 74, the amount of power required by the compressor is substantially equal to the amount of power available from the prime mover. The term "substantially equal" as used herein and in the appended claims with respect to a comparison between the available power and the required power need not mean that the magnitude of the power values are substantially equal. Rather, the term "substantially equal" means that for any particular temperature control unit, the amount of power required by the compressor to operate under the current load setting is closer to the amount of power available from the prime mover than any of the other available load settings.

In other words, the compressor loading conditions are maximized for that particular temperature control unit so that most or all of the maximum available power generated by the prime mover is being used by the compressor to achieve maximum cooling capacity and pull-down potential. Because the power required and the power available are substantially the same, the system 10 continues to run the compressor at the current loading conditions at block 86. At block 88, the system returns to block 14, where the compressor power is determined and the analysis set forth in FIG. 1 begins again.

As seen from the description of the flow beginning at block 50, when the system 10 determines that more power is available to the compressor than the compressor is currently using, the system 10 first operates to maximize the suction pressure $p_s$. Only after the suction pressure $p_s$ is maximized will the system 10 attempt to increase the compressor speed RPM. Again, this order of operation minimizes the amount of high-speed compressor run time, thereby minimizing noise output and wear on the compressor.

As the temperature in the conditioned space moves closer to the set-point, the program outlined in FIG. 1 can be repeated as desired, beginning at block 14, to continually maximize the power usage during pull-down, in the manner described above.

Exactly how the determinations at block 74 (involving the ability to change the compressor speed RPM) is made depends on the type of temperature control unit used, and more specifically on types of components employed. For example, FIG. 2 illustrates one example of how decisions are made at block 74 when the temperature control unit utilizes a diesel engine as the prime mover and the compressor has discrete high, medium, and low-speed operating modes.

Figure 2:
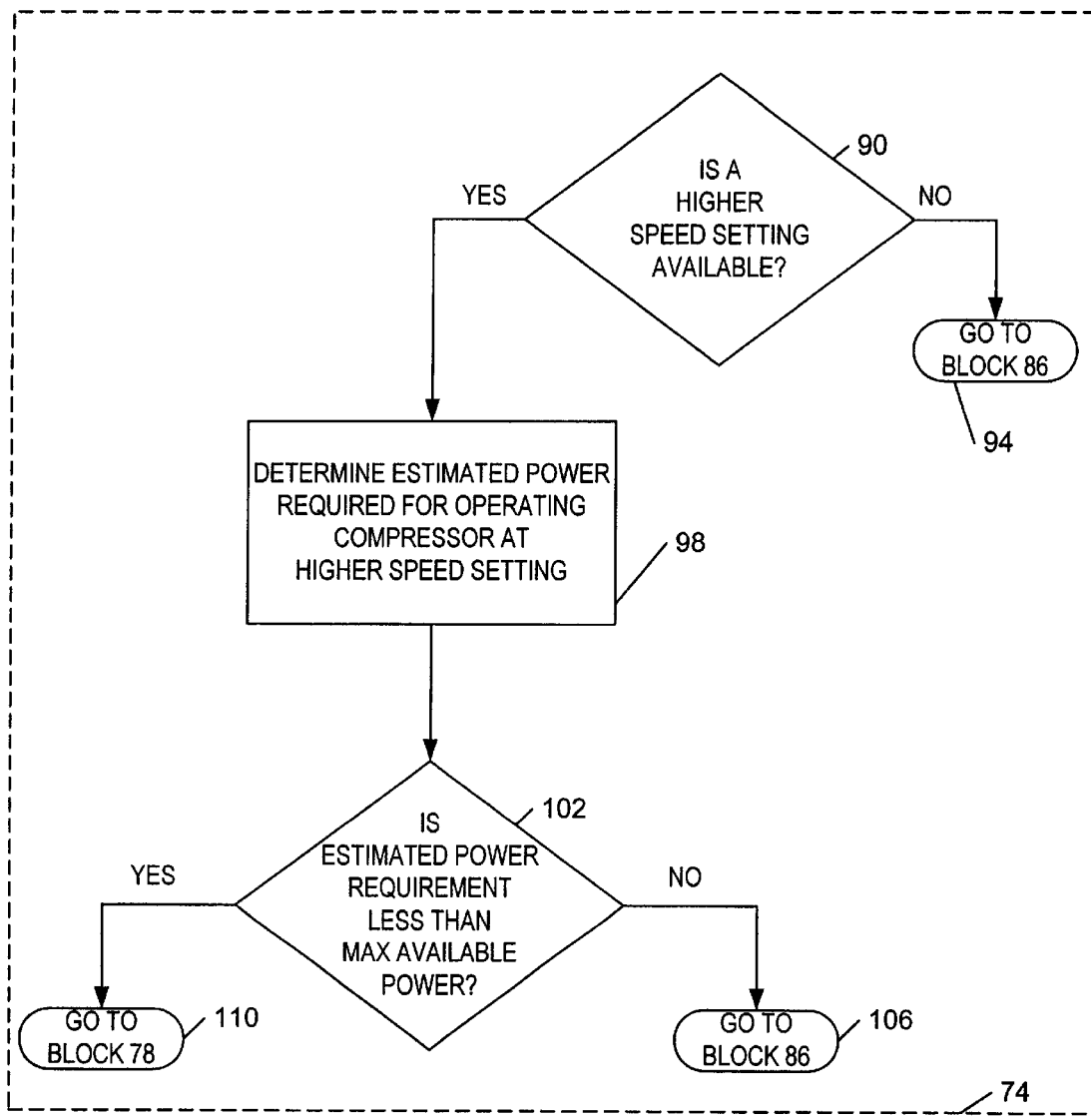
FIG. 2 is a flow chart describing in more detail one method of carrying out the operation of block 74 in FIG. 1.

In FIG. 2, block 90 determines whether a higher speed setting for the compressor is available. A NO answer at block 90 results in the system 10 proceeding to block 94. Because no higher speed setting is available, block 94 directs the system 10 to go to block 86 where the compressor will continue operating at the current speed setting (see FIG. 1).

If, on the other hand, the desired higher speed setting is available (a YES answer at block 90), the system 10 proceeds to block 98 and determines the estimated power requirement for operating the compressor at that higher speed setting. Determining the estimated power requirement at block 98 is accomplished using the same techniques discussed above for the determination at block 14, however, because the compressor speed RPM is changing, there would usually be an associated change in both the suction pressure $p_s$ and the discharge pressure $p_d$. These pressure changes should be taken into account to determine the estimated power requirement for operation at the higher speed setting.

If the estimated power requirement is determined using the power equation set forth above, correction coefficients can be used to more accurately estimate the power requirements at block 98. These correction coefficients can be determined during system testing and could be added to the power calculating equation as desired. Specifically, each parameter that directly includes suction pressure $p_s$ or discharge pressure $p_d$, or is determined as a function of suction pressure $p_s$ or discharge pressure $p_d$, would be estimated or corrected using the correction factors found during system testing. If the look-up table is used to determine the estimated power, the suction pressure $p_s$ and the discharge pressure $p_d$ could be estimated based on test data for the predetermined higher speed setting of the compressor to arrive at the estimated power requirement.

Once the estimated power requirement has been determined, the system 10 determines if the estimated power requirement is less than the power available from the diesel engine at block 102. If the estimated power required is greater than the available power (a NO answer at block 102), the system proceeds to block 106. Because the power required at the higher speed setting is greater than the power available from the diesel engine, block 106 directs the system 10 to proceed to block 86 where the compressor continues operating at the current speed setting (see FIG. 1).

If, on the other hand, the estimated power required is less than the power available from the diesel engine (a YES answer at block 102), the system 10 proceeds to block 110. Because the power required at the higher speed setting is less than the power available from the diesel engine, block 110 directs the system 10 to proceed to block 78 where the compressor is switched to a higher speed setting (see FIG. 1).

The procedure outlined in FIG. 2 for the determinations made at block 74 can also be used when the prime mover is an electric motor. However, in the case of an electric motor, the number of speed settings available would likely be significantly increased due to the ability to infinitely control the compressor speed using a variable frequency electric motor.

Alternatively with a compressor driven by a variable frequency electric motor, real-time adjustments and power calculations can be made for relatively small incremental increases or decreases in compressor speed. In other words, the determinations made at block 74 may be based solely on whether the supply frequency can be increased to increase the compressor speed. If the speed of the compressor can be increased, it will be increased. Then, because the system 10 ultimately returns to block 14 to determine the power requirement after a speed change (see block 82), the system 10 can quickly re-adjust the compressor speed if the previous speed increase was inappropriate.

The system 10 described above maximizes the compressor power by continually monitoring and varying the compressor loading conditions to utilize the maximum power available from the prime mover. It is to be understood that this concept can be implemented in a variety of other ways to achieve the end results achieved by the system 10 of the invention. Other system operating parameters can be used separately, or in addition, to both monitor the relationship between the power required by the compressor and the maximum power available from the prime mover, and to determine whether the loading conditions of the compressor can be changed to maximize power usage.

With a diesel engine for example, engine water temperature or engine oil sump temperature can also be monitored as a measure of the loading on the compressor and the engine. With an electric motor, winding current can be monitored as a measure of the loading on the compressor and the engine. Additionally, compressor discharge temperature can also be indicative of compressor loading. These and other parameters can be used with the above-described system 10, or on their own, to maximize compressor power as contemplated by the invention.

Figure 3:
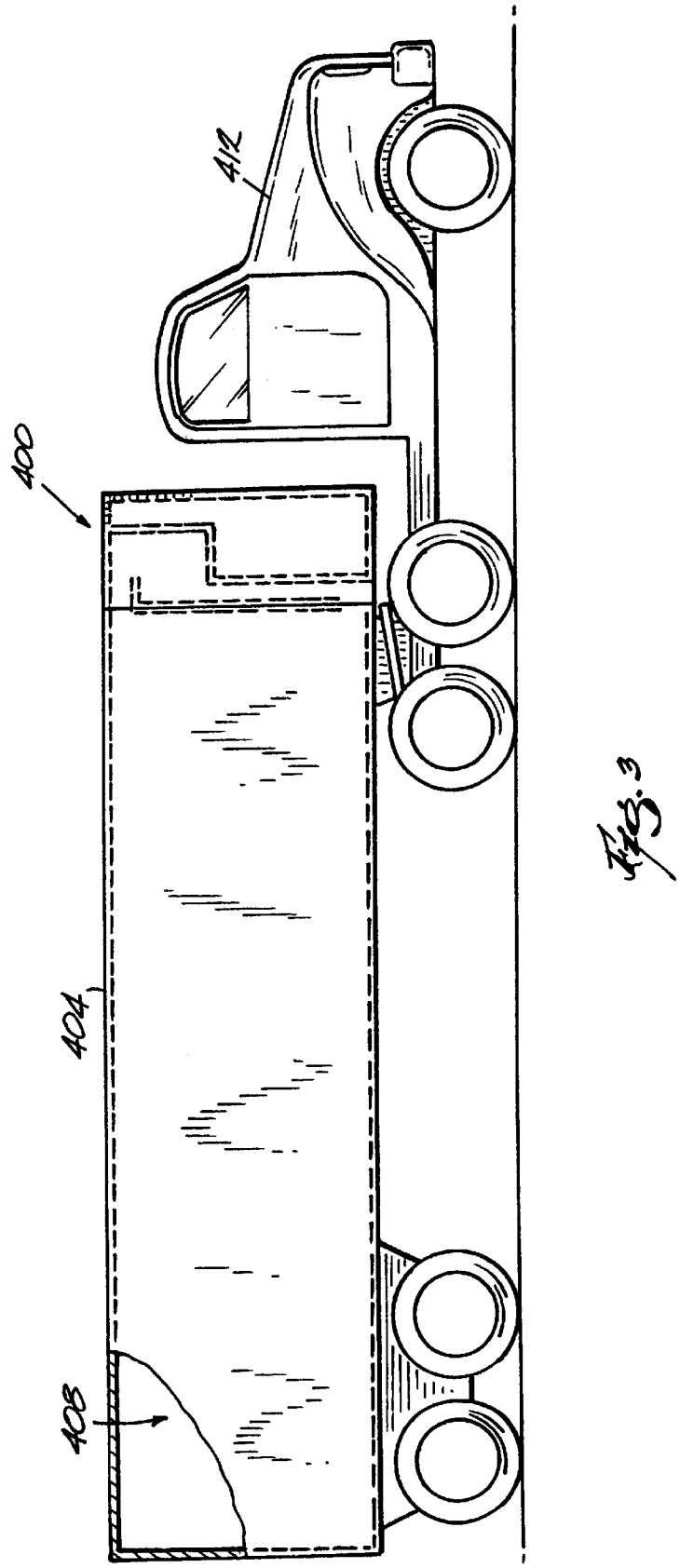
FIG. 3 is a side view, partially in section, of a vehicle having a temperature control unit embodying the present invention.
Figure 4:
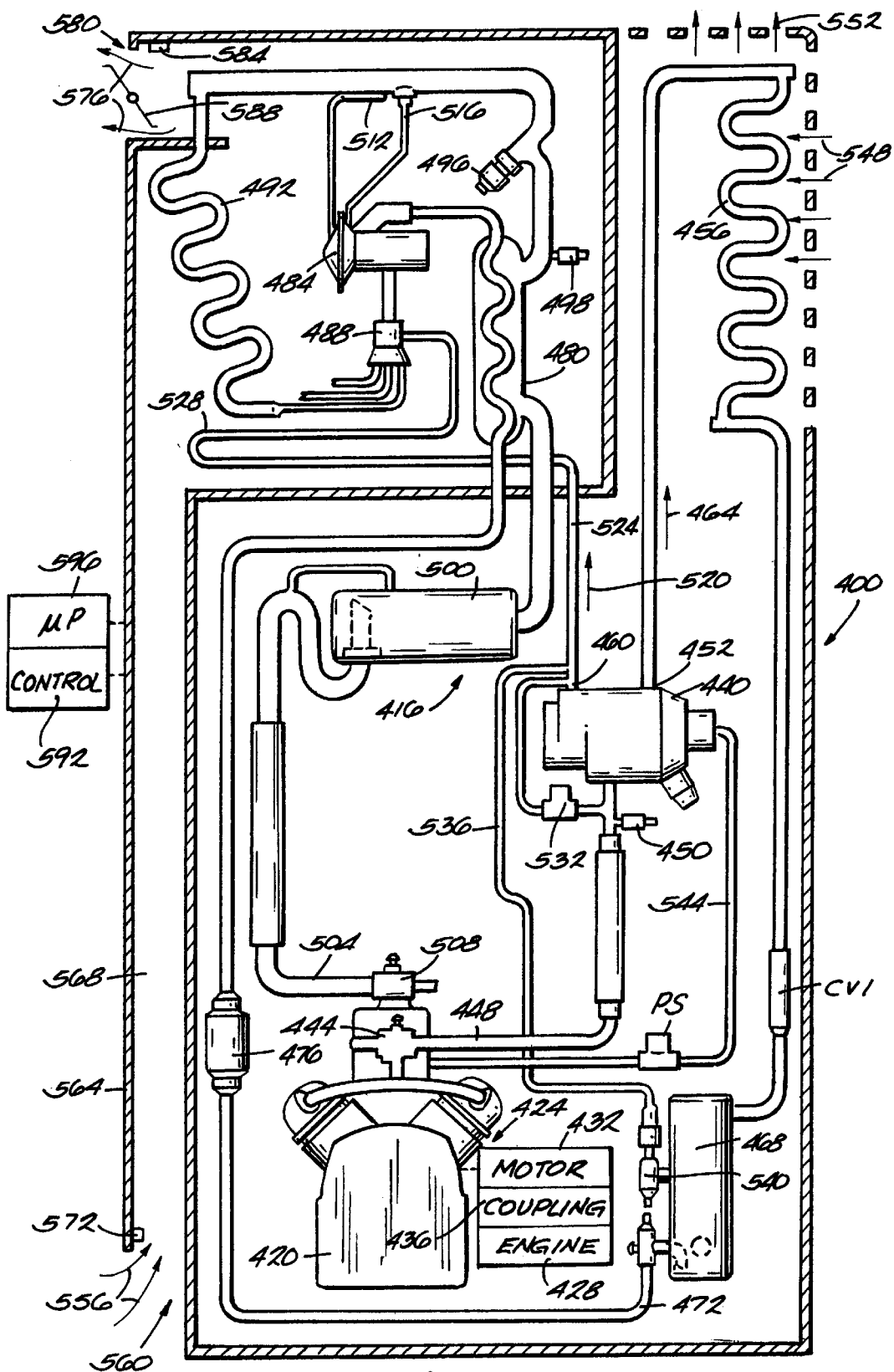
FIG. 4 is a schematic representation of the temperature control unit of FIG. 3.

Referring now to FIGS. 3 and 4, there is shown a temperature control unit 400 which may utilize the present inventive method. The temperature control unit 400 is especially suitable for use in transport applications and may be mounted on a container, truck, or trailer. FIG. 3 shows the unit 400 mounted on a trailer 404 having a conditioned cargo space 408. The trailer is pulled by a tractor 412, as is understood by those skilled in the art.

The temperature control unit 400 controls the temperature of the conditioned space 408 to a specified temperature range adjacent to a selected thermal set-point. As seen in FIG. 4, the temperature control unit 400 has a closed fluid refrigerant circuit or flow path 416 which includes a refrigerant compressor 420 driven by a prime mover arrangement 424. The compressor 420 can be a scroll compressor, a reciprocating compressor, and any other suitable type of compressor. The prime mover arrangement 424 of the illustrated embodiment can include an internal combustion engine 428 and an optional stand-by electric motor 432. The engine 428 and the motor 432, when both are utilized, are coupled to the compressor 420 by a suitable clutch or coupling 436 which disengages the engine 428 while the motor 432 is operative. Alternatively, the prime mover might include only the electric motor 432.

Discharge ports of the compressor 420 are connected to an inlet port of a three-way valve 440 via a discharge service valve 444 and a discharge line 448. A discharge pressure transducer 450 is located in the discharge line 448, upstream of the three-way valve 440, to measure the discharge pressure of the compressed refrigerant. The functions of the three-way valve 440, which selects heating and cooling cycles, may be provided by two separate valves, if desired. The three-way valve 440 has a first outlet port 452, which is selected to initiate a cooling cycle, with the first outlet port 452 being connected to the inlet side of a condenser coil 456. The three-way valve 440 has a second outlet port 460, which is selected to initiate a heating cycle.

When the three-way valve 440 selects the cooling cycle outlet port 452, it connects the compressor 420 in a first refrigerant flow path 464, which in addition to the condenser coil 456, includes a one-way condenser check valve CV1, a receiver 468, a liquid line 472, a refrigerant drier 476, a heat exchanger 480, an expansion valve 484, a refrigerant distributor 488, an evaporator coil 492, an electronic throttling valve 496, a suction pressure transducer 498, another path through the heat exchanger 480, an accumulator 500, a suction line 504, and back to a suction port of compressor 420 via a suction line service valve 508. The expansion valve 484 is controlled by a thermal bulb 512 and an equalizer line 516.

When the three-way valve 440 selects the heating cycle outlet port 460, it connects the compressor 420 in a second refrigerant flow path 520. The second refrigerant flow path 520 by-passes the condenser coil 456 and the expansion valve 484, connecting the hot gas output of compressor 420 to the refrigerant distributor 488 via a hot gas line 524 and a defrost pan heater 528. A hot gas by-pass solenoid valve 532 may optionally be disposed to inject hot gas into the hot gas line 524 during a cooling cycle. A by-pass or pressurizing line 536 connects the hot gas line 524 to the receiver 468 via by-pass and check valves 540, to force refrigerant from the receiver 468 into an active refrigerant flow path during heating and defrost cycles.

A conduit or line 544 connects the three-way valve 440 to the low pressure side of the compressor 420 via a normally closed pilot solenoid valve PS. When the solenoid valve PS is de-energized and thus closed, the three-way valve 440 is spring biased to select the cooling cycle outlet port 452. When the evaporator coil 492 requires defrosting, and when a load being conditioned in the conditioned space 408 requires heat to maintain the thermal set-point, the pilot solenoid valve PS is energized and the low pressure side of the compressor 420 operates the three-way valve 440 to select the heating cycle outlet port 460 to initiate a heating cycle or a defrost cycle.

A condenser fan or blower (not shown), which may be driven by the prime mover arrangement 424, causes ambient air 548 to flow through the condenser coil 456, with the resulting heated air 552 being discharged to the atmosphere. An evaporator fan or blower (not shown), which also may be driven by the prime mover arrangement 424, draws air 556, called "return air", from the conditioned space 408, through an inlet 560 in a bulkhead 564 and up through a bulkhead space 568. The bulkhead 564 preferably runs the entire height of load space 408. A return air temperature sensor 572 samples the air temperature from the bottom of the load space 408.

The resulting conditioned cooled or heated air 576, called "discharge air". is returned or discharged by a fan (not shown) into the conditioned space 408 via an outlet 580. A discharge air temperature sensor 584 samples the air temperature of the discharge air. During an evaporator defrost cycle, a defrost damper 588 may be operated to close the discharge air path to the conditioned space 408.

The transport temperature control unit 400 is controlled by an electrical control 592 which includes a microprocessor based controller 596 and electrical control circuits and components, including relays, solenoids, and the like. The controller 596 receives input signals from appropriate sensors, including inputs from a thermal set-point selector (not shown), which may be actuated to select the desired temperature of the conditioned space 408, an ambient air temperature sensor (not shown), the return air temperature sensor 572, the discharge temperature sensor 584, a coil temperature sensor and switch (not shown) disposed to sense the temperature of the evaporator coil 492, the discharge pressure transducer 450, and the suction pressure transducer 498. The controller 596 provides output signals to, among other things, the electronic throttling valve 496 to control the positioning of the electronic throttling valve 496.

Various features of the invention are set forth in the following claims.

What is claimed is:

1. A method of controlling a compressor in a transport temperature control unit, the temperature control unit having a prime mover providing power to the compressor, and the compressor having a power requirement that varies depending on loading conditions of the compressor, the method comprising:

determining the maximum power available from the prime mover;

determining the power requirement of the compressor; and adjusting the loading conditions of the compressor so that the power requirement of the compressor substantially equals the maximum power available from the prime mover;

wherein adjusting the loading conditions of the compressor includes at least one of (a) while operating the compressor at a low speed setting, varying a suction pressure setting as permitted by the maximum amount of power available to run the compressor until the suction pressure setting reaches a maximum suction pressure setting, and only after the suction pressure setting reaches a maximum suction pressure setting, increasing the speed of the compressor as permitted by the maximum amount of power available to run the compressor; and (b) while operating the compressor at a maximum suction pressure setting, varying a compressor speed setting as required by the maximum amount of power available to run the compressor until the compressor speed setting reaches a minimum speed setting, and only after the compressor speed setting reaches the minimum speed setting, reducing the suction pressure setting as required by the maximum amount of power available to run the compressor.

2. The method of claim 1, wherein the maximum power available from the prime mover is determined via unit testing.

3. The method of claim 1, wherein the power requirement for the compressor is determined using the equation $$P = p_s \cdot V_d \left(\frac{RPM}{60}\right) \cdot \left((PR)^{\left(\frac{n-1}{n}\right)} - 1\right) \cdot \left(\frac{VE}{AE}\right).$$

4. The method of claim 1, wherein the power requirement for the compressor is determined using a look-up table.

5. A method of controlling a compressor in a transport temperature control unit, the temperature control unit having a prime mover providing power to the compressor, and the compressor having a power requirement that varies depending on the loading conditions of the compressor, the method comprising:

determining the maximum power available from the prime mover;

operating the compressor at a first loading condition;

determining the power requirement for the compressor at the first loading condition;

comparing the power requirement for the compressor to the maximum power available to determine if the compressor should continue operating at the first loading condition; and if the compressor should not continue operating at the first loading condition, adjusting the loading conditions so that the power requirement of the compressor substantially equals the maximum power available from the prime mover by at least one of (a) while operating the compressor at a first speed setting, varying a suction pressure setting as permitted by the maximum amount of power available to run the compressor until the suction pressure setting reaches a predetermined suction pressure setting, and only after the suction pressure setting reaches the predetermined suction pressure setting, increasing the speed of the compressor as permitted by the maximum amount of power available to run the compressor; and (b) while operating the compressor at a first suction pressure setting, varying a compressor speed setting as required by the maximum amount of power available to run the compressor until the compressor speed setting reaches a predetermined speed setting, and only after the compressor speed setting reaches the predetermined speed setting, reducing the suction pressure setting as required by the maximum amount of power available to run the compressor.

6. The method of claim 5, wherein the maximum power available from the prime mover is determined from unit testing.

7. The method of claim 5, wherein the power requirement for the compressor is determined using the equation $$P = p_s \cdot V_d \left(\frac{RPM}{60}\right) \cdot \left((PR)^{\left(\frac{n-1}{n}\right)} - 1\right) \cdot \left(\frac{VE}{AE}\right).$$

8. The method of claim 5, wherein the power requirement for the compressor is determined using a look-up table.

9. The method of claim 5, further comprising:

shutting down the unit when the power requirement is greater than the maximum power available.

10. The method of claim 5, further comprising:

estimating the power requirement for the compressor at a second loading condition; and comparing the estimated power requirement at the second loading condition to the maximum power available to determine if the compressor should be operated under the second loading condition.

11. The method of claim 10, wherein the estimated power requirement for the compressor is calculated using the equation $$P = p_s \cdot V_d \left(\frac{RPM}{60}\right) \cdot \left((PR)^{\left(\frac{n-1}{n}\right)} - 1\right) \cdot \left(\frac{VE}{AE}\right).$$

12. The method of claim 10, wherein the estimated power requirement for the compressor is determined using a look-up table.

13. A method of compressor control to maximize the pull-down capacity of a temperature control unit with respect to a predetermined maximum power available to run the compressor, the method comprising:

starting the compressor at a low speed setting and at a suction pressure setting no greater than a predetermined maximum startup setting;

varying the suction pressure setting as permitted by the maximum amount of power available to run the compressor until the suction pressure reaches a maximum suction pressure setting; and only after the suction pressure reaches a maximum suction pressure setting, increasing the speed of the compressor as permitted by the maximum amount of power available to run the compressor.

14. The method of claim 13, further comprising:

after starting the compressor, determining a power requirement for the compressor.

15. The method of claim 14, further comprising:
comparing the power requirement for the compressor to the maximum power available to determine how to vary the suction pressure and the compressor speed.

16. The method of claim 14, wherein the power requirement for the compressor is calculated using the equation $$P = p_s \cdot V_d\left(\frac{RPM}{60}\right) \cdot \left((PR)^{\left(\frac{n-1}{n}\right)} - 1\right) \cdot \left(\frac{VE}{AE}\right).$$

17. The method of claim 14, wherein the power requirement for the compressor is determined using a look-up table.

18. The method of claim 13, wherein once the predetermined maximum power available to run the compressor is surpassed, the method further comprises:
reducing the compressor speed to a minimum speed setting before reducing the suction pressure.

19. A method of compressor control to maximize the pull-down capacity of a temperature control unit with respect to a predetermined maximum power available to run the compressor, the method comprising:
operating the compressor at a maximum suction pressure setting;
varying a compressor speed setting as required by the maximum amount of power available to run the compressor until the compressor speed setting reaches a minimum speed setting; and
only after the compressor speed setting reaches the minimum speed setting, reducing the suction pressure setting as required by the maximum amount of power available to run the compressor.

20. The method of claim 19, further comprising:
determining a power requirement for the compressor.

21. The method of claim 20, further comprising:
comparing the power requirement for the compressor to the maximum power available to determine how to vary the suction pressure and the compressor speed.

22. The method of claim 20, wherein the power requirement for the compressor is calculated using the equation.

$$P = p_s \cdot V_d\left(\frac{RPM}{60}\right) \cdot \left((PR)^{\left(\frac{n-1}{n}\right)} - 1\right) \cdot \left(\frac{VE}{AE}\right).$$

23. The method of claim 20, wherein the power requirement for the compressor is determined using a look-up table.

24. The method of claim 19, further comprising:
starting the compressor at a low speed setting and at a suction pressure setting no greater than a predetermined maximum startup setting;
varying the suction pressure setting as permitted by the maximum amount of power available to run the compressor until the suction pressure reaches the maximum suction pressure setting; and
only after the suction pressure reaches the maximum suction pressure setting, increasing the speed of the compressor as permitted by the maximum amount of power available to run the compressor.

* * * * *